(12) United States Patent
Kim et al.

(10) Patent No.: US 11,625,088 B2
(45) Date of Patent: Apr. 11, 2023

(54) PERIPHERAL INTERFACE POWER ALLOCATION

(71) Applicant: Microsoft Technology Licensing, LLC, Redmond, WA (US)

(72) Inventors: Donghwi Kim, Kirkland, WA (US); Gregory Allen Nielsen, Kirkland, WA (US); Reshed Abdulkader Hussein, Redmond, WA (US); Geo John Palakunnel, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/369,331

(22) Filed: Jul. 7, 2021

(65) Prior Publication Data
US 2023/0009853 A1 Jan. 12, 2023

(51) Int. Cl.
*G06F 1/32* (2019.01)
*G06F 1/3234* (2019.01)
*G06F 13/42* (2006.01)
*G06F 1/3215* (2019.01)

(52) U.S. Cl.
CPC .......... *G06F 1/325* (2013.01); *G06F 1/3215* (2013.01); *G06F 13/4282* (2013.01); *G06F 2213/0042* (2013.01)

(58) Field of Classification Search
CPC ...................................................... G06F 1/32
See application file for complete search history.

(56) References Cited

U.S. PATENT DOCUMENTS

| 2007/0050650 A1* | 3/2007 | Conroy ............... G06F 1/26 713/300 |
| 2011/0208980 A1 | 8/2011 | Brooks |
| 2013/0238920 A1 | 9/2013 | Harris |

(Continued)

OTHER PUBLICATIONS

Manninger, Mario, "Power Management for Portable Devices", In Proceedings of 33rd European Solid-State Circuits Conference, Sep. 11, 2007, pp. 167-173.

(Continued)

*Primary Examiner* — Paul B Yanchus, III
(74) *Attorney, Agent, or Firm* — Alleman Hall Creasman & Tuttle LLP

(57) ABSTRACT

Examples are disclosed that relate to allocating power to peripheral device interfaces. One example provides, at a computing device, a method, comprising obtaining a measurement of power consumption by one or more peripheral devices, and based at least on the measurement and on a maximum power tolerance of a power source, allocating to each respective interface a minimum portion of power output from the power source. The method further comprises rendering a remainder of the maximum power tolerance available for consumption by one or more processors, the remainder including the maximum power tolerance minus a sum of the minimum portions, where the remainder and a system portion of power output are available for consumption by the one or more processors, and where a performance attribute of the one or more processors is not throttled while total power consumption does not exceed a threshold power output from the power source.

20 Claims, 7 Drawing Sheets

(56) References Cited

U.S. PATENT DOCUMENTS

| | | | |
|---|---|---|---|
| 2014/0075212 A1* | 3/2014 | Urbina | G06F 1/3287 713/300 |
| 2015/0106638 A1 | 4/2015 | Sun et al. | |
| 2015/0160674 A1 | 6/2015 | Burdette et al. | |
| 2017/0023993 A1 | 1/2017 | Sultenfuss et al. | |
| 2017/0085084 A1 | 3/2017 | Daly | |
| 2018/0120910 A1 | 5/2018 | Farkas et al. | |
| 2018/0136705 A1 | 5/2018 | Obie et al. | |
| 2018/0284866 A1 | 10/2018 | Sakai et al. | |
| 2019/0041971 A1 | 2/2019 | Ananthakrishnan et al. | |
| 2020/0310522 A1 | 10/2020 | Cueva et al. | |
| 2021/0026428 A1* | 1/2021 | Olarig | G06F 1/3228 |
| 2021/0103330 A1 | 4/2021 | Tan et al. | |
| 2021/0109578 A1 | 4/2021 | Umapathy et al. | |

OTHER PUBLICATIONS

"International Search Report and Written Opinion Issued in PCT Application No. PCT/US22/031227", dated Sep. 21, 2022, 12 Pages.

* cited by examiner

| Interface A ~202 | Interface B ~204 | Min. alloc. to interface A ~210 | Min. alloc. to interface B ~212 | Total min. alloc. ~206 | Remainder ~216 |
|---|---|---|---|---|---|
| 15 | 7.5 | 4.5 | 2 | 6.5 = (15 + 7.5 − 16) | 9.5 |
| 15 | 4.5 | 2.5 | 1 | 3.5 = (15 + 4.5) − 16 | 12.5 |
| 7.5 | 15 | 2 | 4.5 | 6.5 = (7.5 + 15 − 16) | 9.5 |
| 7.5 | 7.5 | 0 | 0 | 0 = (7.5 + 7.5 − 16) | 16 |
| 7.5 | 4.5 | 0 | 0 | 0 = (7.5 + 4.5 − 16) | 16 |
| 4.5 | 15 | 1 | 2.5 | 3.5 = (4.5 + 15 − 16) | 12.5 |
| 4.5 | 7.5 | 0 | 0 | 0 = (4.5 + 7.5 − 16) | 16 |
| 4.5 | 4.5 | 0 | 0 | 0 = (4.5 + 4.5 − 16) | 16 |
| 15 | -- | 0 | 0 | 0 = (15 − 16) | 16 |
| 7.5 | -- | 0 | 0 | 0 = (7.5 − 16) | 16 |
| 4.5 | -- | 0 | 0 | 0 = (4.5 − 16) | 16 |
| -- | 15 | 0 | 0 | 0 = (15 − 16) | 16 |
| -- | 7.5 | 0 | 0 | 0 = (7.5 − 16) | 16 |
| -- | 4.5 | 0 | 0 | 0 = (4.5 − 16) | 16 |

FIG. 2

PERIPHERAL INTERFACE POWER ALLOCATION

BACKGROUND

A typical computing device includes one or more interfaces with which a peripheral device may be attached, such as an input device, storage device, or charging device. Upon attaching a peripheral device via an interface, the computing device may allocate a predetermined amount of power to the interface to thereby power and enable use of the peripheral device.

BRIEF DESCRIPTION OF THE DRAWINGS

FIG. 2 depicts a table illustrating an example determination of minimum power allocations to peripheral interfaces of a computing device.

DETAILED DESCRIPTION

Figure 1:
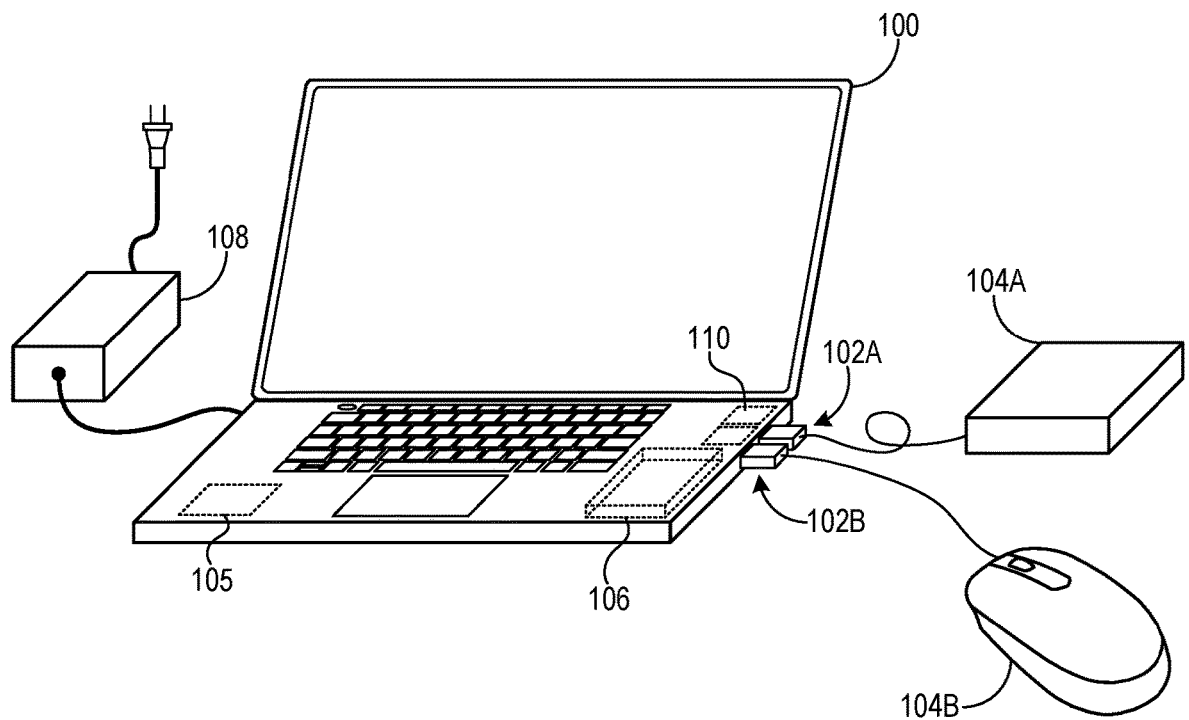
FIG. 1 depicts an example computing device including peripheral interfaces.

A typical computing device includes one or more interfaces with which a peripheral device may be attached. One such interface found at a typical computing device is a universal serial bus (USB) port, which may enable the attachment of peripheral devices including but not limited to an input device (e.g., keyboard, mouse), storage device (e.g., external hard drive), and charging device (e.g., USB hub). Upon attaching a peripheral device via a USB port or other interface, a computing device may allocate a predetermined amount of power to the interface to thereby power and enable use of the peripheral device. The predetermined amount of power may be established by a standard implemented at the interface—e.g., a maximum amount of power that can be supplied to the interface that facilitates operation of compliant peripherals. Where the computing device includes a USB-C port, for example, the computing device may allocate a predetermined amount of power stipulated by the USB-C standard to the port (e.g., 7.5 W, 15 W). In other examples, a computing device may allocate to a peripheral interface an amount of power that is requested by a peripheral device attached to the interface. For example, peripheral devices that support the USB power delivery (PD) standard may request one of a plurality of discrete power levels, which may be supplied to corresponding interfaces by the computing device.

In either power allocation paradigm—whether a predetermined amount of power is allocated without input from a peripheral device, or discrete power levels are allocated as requested by a peripheral device—an amount of power may be allocated to an interface that is greater than the amount of power actually consumed by a peripheral device attached to that interface. While the first power allocation paradigm may facilitate peripheral device operation by providing the maximum power that can be allocated to an interface, this paradigm results in unnecessary power allocation at the interface during any periods in which a peripheral device does not consume the maximum allocatable power. Although the second power allocation paradigm may reduce the extent of unnecessary peripheral power allocation, excessive power allocation may yet remain for periods in which a peripheral device consumes less than a requested power level. Further, many peripheral devices do not support the USB-PD standard or other mechanisms for requesting power levels. In both paradigms, power allocation is likely to exceed power consumption during peripheral device use sessions, for example during peripheral device idle or following relatively transient events such as device charging or data transfer.

In some examples, excessive power allocation to peripheral device interfaces may have a parasitic effect on other power-consuming components of a computing device. For example, the power allocated to peripheral interfaces may be such that the remaining amount of power available to one or more processors (e.g., central processing unit (CPU), graphics processing unit (GPU)) of the computing device is insufficient to enable desired or nominal operation of the processor(s), resulting in degraded performance. In other examples, spikes in power consumption by a processor—combined with the power allocated to peripheral device interfaces—may cause the total power consumption by a computing device to exceed what can be provided by a power source, or to exceed an upper limit established to facilitate nominal device operation. Here, the peripheral power allocation makes it easier for spikes to cause excess power consumption. Various mitigating actions may be taken in response to such excess power consumption, such as throttling processor performance, which again degrades device performance. Where a power source includes a battery, excessive power consumption may result in approaching a lower limit on battery voltage that when reached may result in disconnection of the battery and potential data loss as a computing device powers down. In battery-powered contexts, these issues may be exacerbated as battery charge decreases and reduces the power that can be allocated to peripheral device interfaces and processors.

Accordingly, examples are disclosed that relate to allocating power to peripheral device interfaces based on measured power consumption by peripheral devices attached to the interfaces. In one example, a measurement of power consumption by one or more peripheral devices, each attached to a computing device via a respective interface, is obtained. Based at least on the measurement of power consumption, and also on a maximum power tolerance of a power source of the computing device, a minimum portion of power output from the power source is allocated to each respective interface. The remainder of the maximum power tolerance—where the remainder includes the maximum power tolerance minus the sum of the minimum portions allocated to each interface—is then rendered available for consumption by one or more processors of the computing device. In addition to the remainder, a system portion of power output from the power source is also available for consumption by the one or more processors. A performance attribute of the one or more processors, such as a clock frequency, remains unthrottled while total power consumption by the computing device does not exceed a threshold power output from the power source.

In this approach, power allocations to peripheral device interfaces are minimized based on the actual power being consumed at those interfaces. This enables the remainder to be used as power headroom that may be drawn from to facilitate peripheral device operation when power consumption by a peripheral exceeds its minimum allocation. Additionally, where the remainder is not exhausted by peripheral device consumption, the remainder may be available for consumption by computing device processors, which may be utilized during spikes in power consumption, for example. Having the remainder available for processor consumption may reduce the frequency with which mitigating actions are taken in response to processor power consumption—or overall system power consumption—exceeding a threshold, such as throttling processor performance or disconnecting a battery. As such, the disclosed mechanisms may facilitate on-demand power distribution while maximizing performance and minimizing potential data loss or other consequences of excess demand.

Throughout this disclosure, allocations of power to peripheral device interfaces and peripheral devices are described. As used herein, an "allocation" of power to a peripheral device interface or peripheral device may be, or may be based on, an expected value of power consumption that is expected to be consumed by the interface/device. In some examples, an "allocation" of power to a peripheral device interface or peripheral device alternatively or additionally may refer to a minimum value of power that is guaranteed to the interface/device. However, in at least some examples, a peripheral device interface or peripheral device may be permitted to consume more power than what is allocated to the interface/device, for example as the interface/device demands or requests more power than what has been allocated. In this case, disparities between actual peripheral power consumption and allocated power may prompt the determination of an updated power allocation to a peripheral device/interface. As described in greater detail below, power allocations to peripheral device interfaces/devices are used in computing the maximum power that one or more processors are allowed to consume. As a peripheral power allocation is reduced, a processor may be allowed to consume a greater maximum power, for example. As such, peripheral allocations as discussed herein may relate to establishing baseline power levels for peripheral interfaces/devices based on their expected power consumption with allowance for the peripheral allocations to be exceeded, while leading to the establishment of a cap on power consumption by one or more processors. In some examples, processor power consumption may not be permitted to exceed the cap. In other examples where processor power consumption is allowed to exceed the cap, various mitigating actions may be taken to reduce processor and/or overall computing device power consumption. Further, while examples are described in relation to two peripheral interfaces, the disclosed approaches may be adapted to a computing device having any suitable number of peripheral interfaces.

FIG. 1 depicts an example computing device 100 that includes a first peripheral interface 102A and a second peripheral interface 102B. Computing device 100 is shown in the form of a laptop, but may assume any suitable form including but not limited to that of a tablet, mobile phone, game console, desktop computer, or server computer. In this example, two peripheral devices 104 are attached to computing device 100 via peripheral interfaces 102: a first peripheral device 104A shown in the form of a storage device (e.g., an external hard drive) attached via peripheral interface 102A, and a second peripheral device 104B shown in the form of a mouse attached via peripheral interface 102B. Peripheral devices attached to computing device 100 may assume any suitable form, however, including but not limited to that of a hub, charging device, keyboard or other input device, speaker or other output device, and printer.

As described below, computing device 100 allocates a respective portion of power output from a power source to each peripheral interface 102 based on the measured power consumption by the peripheral device 104 attached to that peripheral interface. In the depicted example, the power source from which power is allocated to peripheral interfaces 102 and used to power components of computing device 100—e.g., non-peripheral devices such as one or more processors implemented at the computing device—includes a battery 106 implemented at the computing device. FIG. 1 depicts the inclusion of a processor 105 at computing device 100, shown in the form of a system-on-a-chip (SoC) that may implement a CPU and GPU in a common package. Computing device 100 may implement any suitable type and number of processors, however, including but not limited to a discrete CPU and discrete GPU provided on separate packages. Battery 106 may report—e.g., by way of an integrated controller—various information regarding the battery, such as a measure of power output (e.g., output current, output voltage, and/or output power) by the battery and a level of charge of the battery, which may be used by computing device 100 in determining power allocations to peripheral interfaces 102, as described below.

In some examples, the power source from which power is allocated to peripheral interfaces 102 and used to power components of computing device 100 may include a power supply 108 (e.g., in addition to battery 106) configured to supply power derived from a mains power source. Thus, as used herein, "power source" may refer to one or more individual power sources that may be used in combination to power a computing device and/or attached peripheral devices. Power supply 108 is depicted as an external power supply, but may be implemented as an internal power supply or in any other suitable manner. As described below, power calculations and resultant allocations may differ depending on whether power supply 108 is present or absent.

Power consumption by peripheral devices 104 may be measured in any suitable manner. In some examples, computing device 100 may include one or more (e.g., embedded) controllers (e.g., controller 110) having an integrated power meter with which power consumption by the peripheral device may be measured and read by the computing device. In some examples, a respective controller 110 may be provided for each peripheral interface 102. Controller 110 may assume any suitable form. As an example, controller 110 may assume the form of a USB-PD controller, in which case peripheral device 104A may be a USB storage device, and peripheral interface 102A (potentially along with peripheral interface 102B) may be a USB interface configured to implement at least part of a USB specification (e.g., USB-C). The disclosed approaches may apply to any suitable type of peripheral device, peripheral interface, and peripheral device specification and/or standard, however. In other examples, computing device 100 may not include a controller with which peripheral device power consumption is measured. In this case, a discrete power meter may be provided at computing device 100 for measuring peripheral device power consumption. Any suitable aspect of power consumption by a peripheral device 104 may be measured, including but not limited to the power, current, and/or voltage consumed by the peripheral device.

As mentioned above, computing device 100 may allocate portions of power output from its power source (e.g., battery 106 and/or power supply 108) to peripheral interfaces 102 that, during at least some periods of operation, are less than a fixed power level that might otherwise be allocated for a peripheral device 104 use session (e.g., a power level stipulated by an interface standard such as USB) or a power level requested by a peripheral device. More particularly, for an individual peripheral interface such as interface 102A, computing device 100 may allocate an initial minimum portion of power output from its power source to the interface based on the maximum allocatable portion of power output that is allocatable to the interface. Computing device 100 may then update power allocations to interface 102A based on based on the measured power consumption by peripheral device 104A attached to the interface. During at least some periods of operation, these updated allocations may be less than the maximum power allocatable to interface 102A. Such ability to provide power allocations to peripheral interface 102A that are less than what can be allocated to the interface is enabled at least in part by what is referred to herein as a "maximum power tolerance" of the power source of computing device 100. This maximum power tolerance may be utilized as a "reserve pool" or "headroom" from which power may be selectively allocated to a peripheral device 102—e.g., additional power beyond a minimum allocation provided in response to increasing power demands by the peripheral—and/or drawn from for consumption by non-peripheral components of computing device 100 such as processor 105.

In some examples, the maximum power tolerance may be derived from the power output of battery 106. In such examples, the maximum power tolerance may be defined according to the following relation: $(x*P_{max})-(y*P_{max})$, where x is a multiplication factor (e.g., 110%), y is a multiplication factor (100%), and $P_{max}$ is the maximum output power from battery 106. The maximum power output from battery 106 may be reported by an embedded controller provided at the battery, for example. Further, in some examples, the maximum power tolerance may account for power consumed by PD controller(s)—referred to as "Vconn power"—provided at computing device 100 (e.g., controller 110). As power consumed by a PD controller may be unmeasurable through a power meter in some examples, the maximum power tolerance may account for the potential presence of one or more PD controllers at computing device 100. Accordingly, for the example depicted in FIG. 1, the potential presence of two PD controllers at computing device 100 may be accounted for by subtracting the total power that would be consumed, were the PD controllers present, from the maximum power tolerance. As an example in which the power consumed by a PD controller is substantially 1.5 W, the total power potentially consumed by two PD controllers at computing device 100 is 3 W, which may be subtracted from the maximum power tolerance.

FIG. 2 depicts a table 200 illustrating an example approach to determining minimum power allocations to peripheral interfaces of a computing device given a maximum power tolerance of a power source of the computing device. The minimum power allocations shown therein may be initial allocations (e.g., made upon attachment of a peripheral device to a peripheral interface) that are then updated based on measured power consumption by peripherals, as described below. As described above, power allocations to peripheral interfaces illustrated in FIG. 2 may guarantee at least a baseline power level to those interfaces, but may be exceeded (e.g., as peripheral device demands exceed what is allocated to their corresponding interface(s)). In this example, minimum power allocations are determined for two peripheral interfaces (e.g., interfaces 102) for various combinations of attached peripheral devices and various values of maximum allocatable power representing the maximum power (in Watts) that can be allocated to the interfaces and/or consumed by attached peripherals. The maximum allocatable power values may be specified by an interface standard such as USB, for example. Additionally, in this example the maximum power tolerance is calculated as 16 W, and accounts for potential PD controller power consumption at both peripheral interfaces, where the maximum power that can be allocated to a first interface (interface A) is 15 W, and the maximum power that can be allocated to a second interface (interface B) is 7.5 W. Table 200 may represent an example in which power is allocated to USB peripheral interfaces and USB devices (e.g., USB-C devices).

A first column 202 and a second column 204 respectively indicate various maximum allocatable power values representing the maximum power that can be allocated to their corresponding peripheral interfaces. For each pair of maximum allocatable power values illustrated in columns 202 and 204, a corresponding calculation of a minimum allocation—that is, a total minimum allocation across both peripheral interfaces—is shown in a column 206. In this example approach illustrated by FIG. 2, the total minimum allocation for the peripheral interfaces is calculated as the sum of the individual maximum allocatable power values at each interface subtracted by the maximum power tolerance. In a row 208, for example, the total minimum allocation to the peripheral interfaces is calculated as 15 W+7.5 W−16 W, resulting in a total minimum allocation of 6.5 W. Columns 210 and 212 illustrate, for each pair of maximum allocatable power values and corresponding total minimum allocation, how the total minimum allocation may be distributed between the peripheral interfaces as respective minimum allocations. In row 208, the total minimum allocation of 6.5 W is distributed as 4.5 W to peripheral interface A, and as 2 W to peripheral interface B. Here, the minimum allocation to peripheral interface A is greater than the minimum allocation to peripheral interface B as the maximum allocatable power at peripheral interface A is greater than that at peripheral interface B. In other examples, equal minimum allocations may be provided to peripheral interfaces A and B.

Where the total maximum power allocatable at peripheral interfaces A and B is less than the maximum power tolerance, the total minimum allocation between both interfaces, and individual minimum allocations for both interfaces, may be set to zero. In this case, the total maximum allocatable power between both peripheral interfaces is within the maximum power tolerance, thus obviating any allocation of the maximum power tolerance to the peripheral interfaces. In a row 214, for example, the total maximum allocatable power is 15 W, and less than the 16 W maximum power tolerance. As such, the minimum total allocation, and individual allocations, for row 214 are set to zero.

Column 216 illustrates, for each pair of maximum allocatable power values at the peripheral interfaces and corresponding minimum allocations, the remainder of the maximum power tolerance that is not allocated to the peripheral interfaces. In this example, the remainder is calculated as the maximum power tolerance minus the total minimum allocation to the peripheral interfaces. In row 208, for example, 6.5 W of the 16 W maximum power tolerance is allocated to the peripheral interfaces, leaving a 9.5 W remainder. As noted above, this remainder may be selectively used by peripheral interfaces and their attached peripherals, and/or by non-peripheral components such as one or more processors (e.g., processor 105). More particularly, the remainder may be utilized by a peripheral device upon the power consumed by that peripheral exceeding the minimum power allocation that was allocated to that peripheral. In this approach, the combination of (1) the total minimum power allocation to both peripheral interfaces and (2) the remainder of the maximum power tolerance may facilitate peripheral device operation including periods of operation in which peripherals consume their maximum allocatable power levels, without unnecessarily allocating power that is not required for device operation. This leaves the remainder, during periods of operation in which the remainder is not entirely consumed by peripheral devices, available for use by non-peripheral components.

Figure 3:
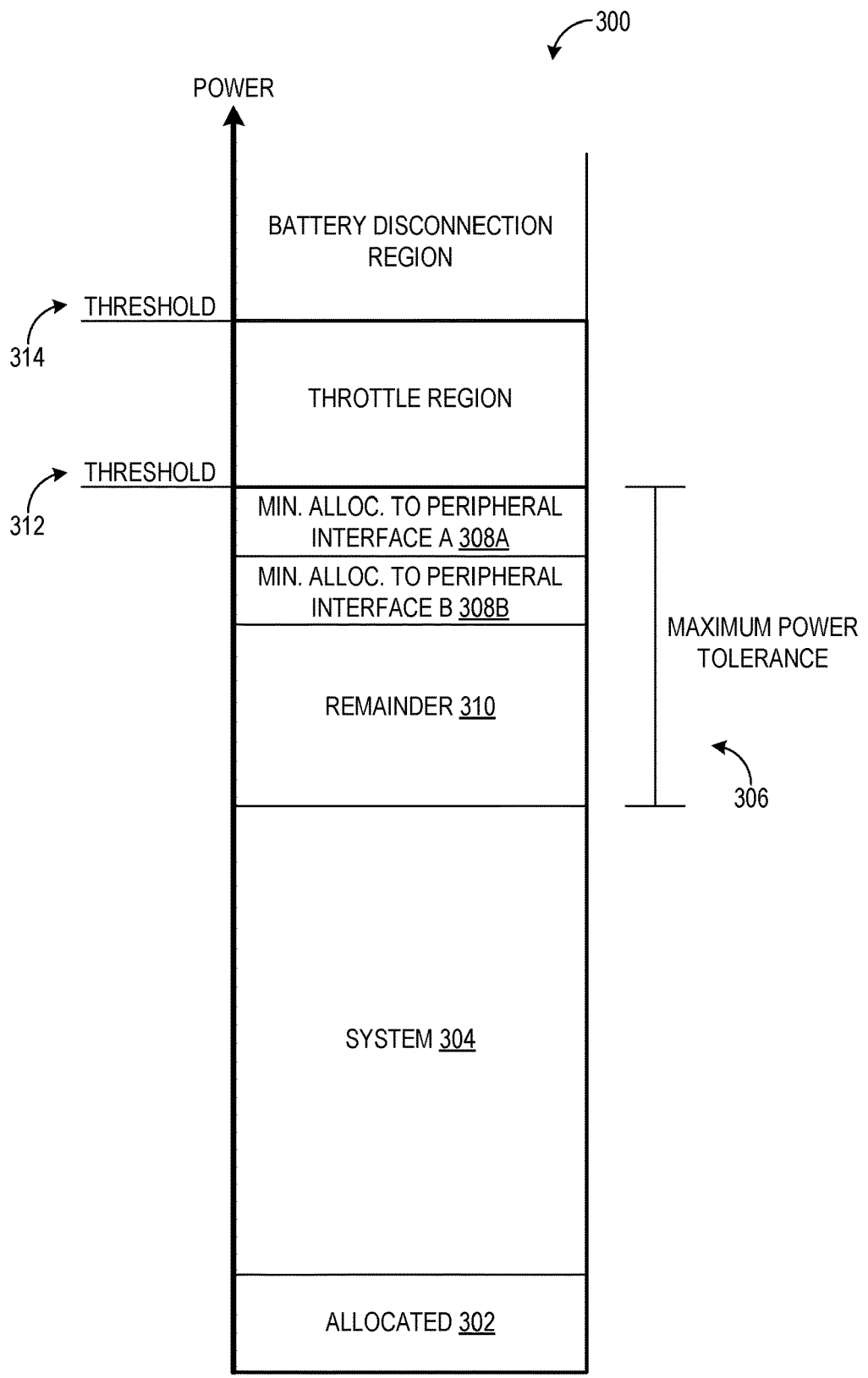
FIG. 3 depicts a graph illustrating example use of a remainder of a maximum power tolerance of a power source.

FIG. 3 depicts a graph 300 illustrating example use of the remainder of a maximum power tolerance of a power source. The use of the remainder is shown in the context of an overall distribution of power output from the power source among various components—including peripheral and non-peripheral components—of a computing device such as computing device 100.

In this example, the power output from the power source includes an allocated portion 302 allocated to one or more non-peripheral components of the computing device. Such non-peripheral components may include but are not limited to a display, voltage regulator and other power infrastructure components, controller, internal hard drive, and/or disk drive. The power output from the power source further includes a system portion 304 usable by one or more processors of the computing device (e.g., processor 105). System portion 304 may include a portion allocated to the processor(s)—e.g., a fixed portion dedicated for use by the processor(s). In some examples, system portion 304 may further include, in addition to the portion allocated to the processor(s), an unallocated or free portion that is useable by the processor(s) in conditions in which the allocated portion is insufficient to facilitate desired operation of the processor(s).

The power output from the power source further includes a maximum power tolerance 306, which includes respective minimum allocations 308A and 308B to two peripheral device interfaces (e.g., interfaces 102), and a remainder 310 that is not allocated to either peripheral interface. As described above, remainder 310 is available for use by the one or more processors. For example, remainder 310 may be used in a manner that increases the maximum power that a processor is allowed to consume. In this example, the maximum power the processor is allowed to consume may be established according to the following relation:

$$P_{proc,max} = [P_{bat,max} + (P_{psu} * \text{eff}_{charger} - (P_{rop}/\text{eff}_{vr})] * \text{eff}_{cpu\_reg},$$

where $P_{proc,max}$ is the maximum power the processor is allowed to consume, $P_{bat,max}$ is the maximum power that a battery can provide (e.g., as reported by the battery) while remaining above a minimum system voltage, $P_{psu}$ is the maximum power a power supply (if present) can provide to prevent reaching the minimum system voltage, $\text{eff}_{charger}$ is the efficiency of a charger located at the computing device, $P_{rop}$ is the maximum power consumed by non-processor components of the computing device including attached peripheral devices, $\text{eff}_{vr}$ is the efficiency of one or more voltage regulators, and $\text{eff}_{cpu\_reg}$ is the efficiency of a processor regulator. As may be seen from this relation, reducing $P_{rop}$ increases $P_{proc,max}$—the maximum power the processor is allowed to consume. In view of the description above, $P_{rop}$ may be reduced by allocating minimum portions of power output to peripheral device interfaces, rather than allocating maximum allocatable portions of power output, or by reducing existing power allocations to the interfaces. The portion of power that is saved by this reduced allocation may be provided to processor(s) as remainder 310. Further, where a power supply is not present, $P_{psu}$ may be set to zero. It will be understood that power measurements, calculations, and allocations may occur at a sampling rate (e.g., on the order of a second). As such, measurements of a maximum power or power-related attribute may refer to a maximum power or other power-related attribute within a sampling period.

FIG. 3 also illustrates various actions that may be taken for various threshold levels of total system power consumption at a computing device. Upon reaching a first threshold 312 of total system power consumption (e.g., as a result of processor power consumption), one or more performance attributes of one or more processors may be throttled (e.g., to thereby reduce total system power consumption below the first threshold). As one example, a clock frequency of a processor may be reduced as part of such throttling. However, a performance attribute of a processor may not be throttled while the total system power consumption by the computing device does not exceed first threshold 312. First and second thresholds 312 and 314 may be defined in terms of the maximum power output from a battery. As examples, first threshold 312 may be defined as 110% of the maximum power output from the battery at 100% charge, while second threshold 314 may be defined as 120% of the maximum power output from the battery at 100% charge. Upon reaching a second threshold 314 of total system power consumption, a battery implemented at or associated with the computing device may be electrically disconnected. Second threshold 314 may correspond to operational regions where a minimum battery voltage is approached.

Figure 4:
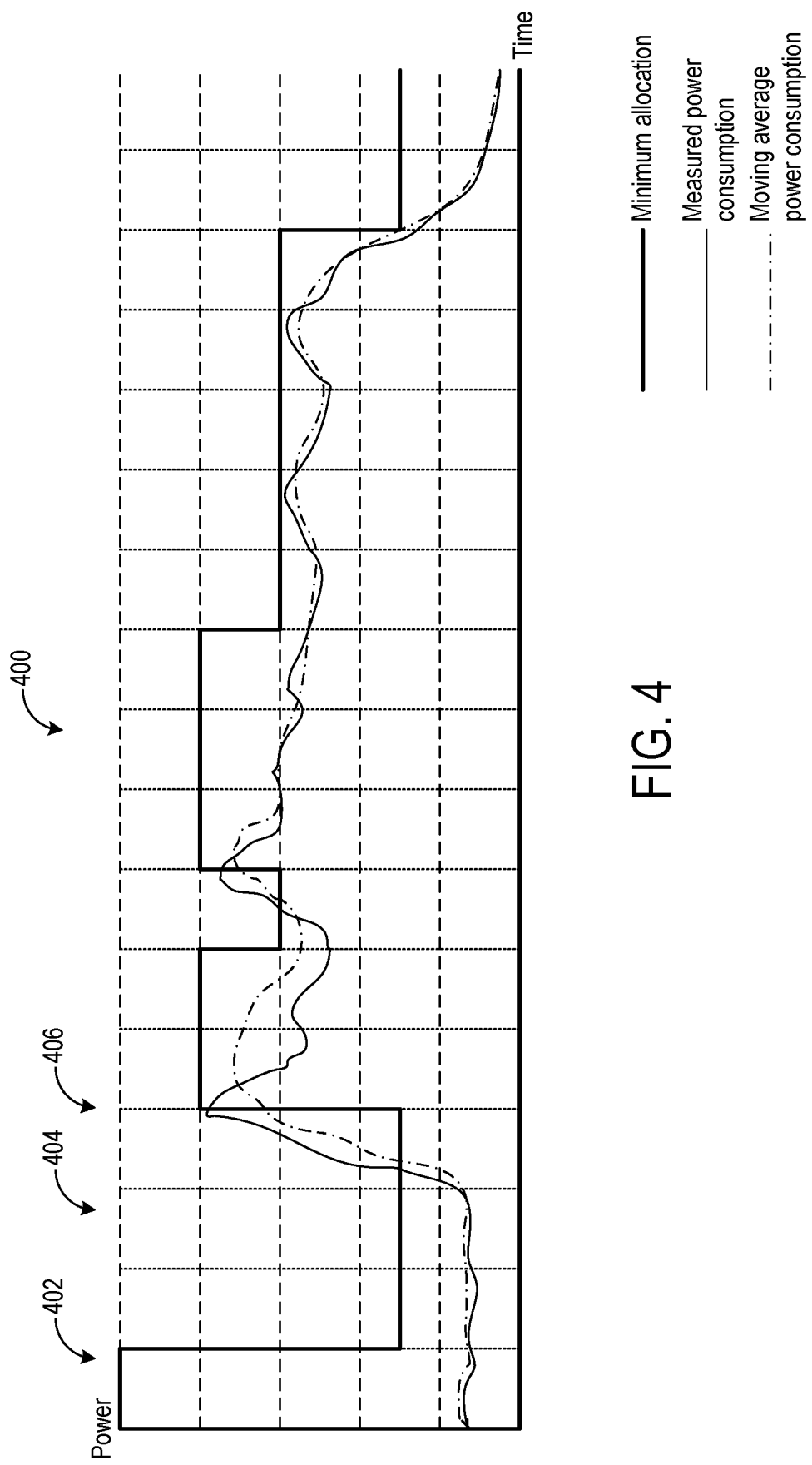
FIG. 4 depicts a graph illustrating example minimum allocations of power output of a power source to a peripheral device interface.

FIG. 4 shows a graph 400 illustrating dynamically changing minimum allocations of power output of a power source to a peripheral device interface (e.g., interface 102A) as a function of time, based on measurements of power consumption by a peripheral device (e.g., device 104B) attached to the interface. As indicated at 402, in some examples, the maximum allocatable portion of power output that is allocatable to the peripheral interface may be initially allocated to the interface prior to allocating a lesser minimum portion to the interface. Where an attached peripheral device is a USB device, this approach may be taken for USB devices that do not support USB-PD to facilitate their operation (e.g., before their actual power consumption becomes measurable). For a USB device that do support USB-PD, a power level requested or contracted by the device may be initially allocated to its corresponding interface, where the power level may be greater than subsequent minimum allocation(s). Alternatively or in addition to allocating the maximum allocatable portion to the peripheral interface, an initial minimum portion of power output of the power source may be allocated to the interface. The initial minimum portion may be determined based on the maximum allocatable portion allocatable to the peripheral interface and on the maximum power tolerance of the power source, as described above.

As indicated at 404, a minimum allocation is determined that is less than the maximum allocatable portion of power. As illustrated here, in some examples, a minimum allocation may be derived from a measurement of actual power consumption by the peripheral, with the measurement being rounded up to a nearest discrete power level. Such rounding may provide an operational margin that helps to render minimum allocations sufficient for their peripheral devices.

As indicated at 406, an abrupt rise in power consumption by the peripheral device is detected. In some examples, a minimum allocation may be adjusted in response to detecting a change (e.g., between adjacent sampling periods) in power consumption greater than or equal to a threshold (e.g., 3 W). Accordingly, at 406, the minimum allocation is increased relative to the prior minimum allocation due to such threshold change in power consumption. Further, in some examples, where a change in power consumption greater than or equal to the threshold is not detected between sampling periods, but the moving average of actual power consumption by the peripheral device is greater than a corresponding sample of actual power consumption, a minimum allocation may be selected that is a discrete power level resulting from rounding up the sample of actual power consumption. Such criteria may also be used to determine updated minimum allocations that are less than prior minimum allocations. As illustrated by FIG. 4, minimum allocations may be continually updated throughout operation of a computing device to thereby optimize the power available to peripheral interfaces, attached peripherals, and non-peripheral devices such as processor(s).

Figure 5:
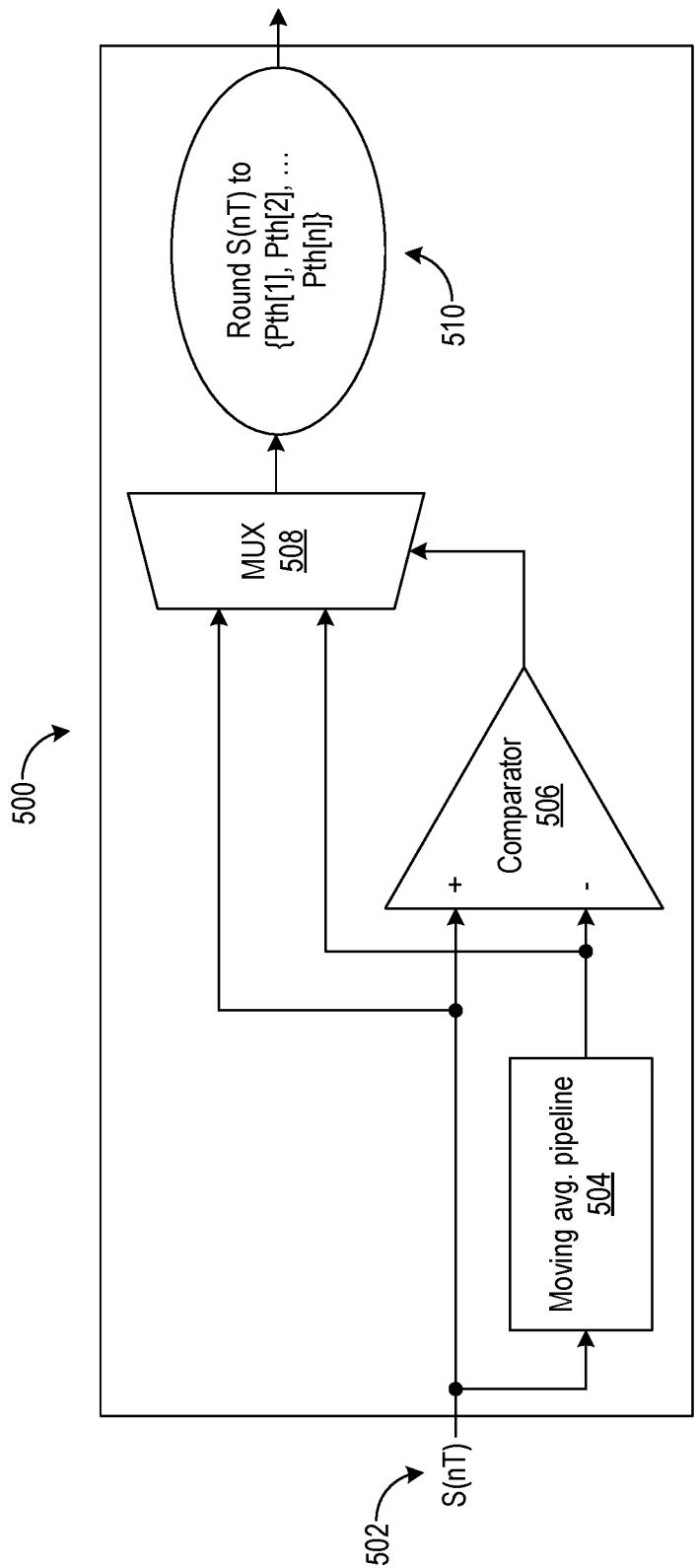
FIG. 5 schematically depicts an example system for allocating portions of power output to a peripheral device interface.

FIG. 5 schematically depicts an example system 500 for allocating portions of power output to a peripheral device interface. System 500 may be implemented in software executed at computing device 100, for example, or in any other suitable manner. As indicated at 502, a sample (S(nT)) of power consumption at a peripheral interface is read at a sampling rate. This sample is fed to a moving average pipeline 504, configured to calculate a moving average of power consumption at the peripheral interface, and to an input of a comparator 506, which receives at another input the moving average of power consumption. Comparator 506 computes a comparison (e.g., difference) between the sample of power consumption and the moving average, and outputs the comparison to a multiplexer 508, which also receives the sample of power consumption and the moving average. As indicated at 510, output from multiplexer 508 is rounded up to a nearest discrete power level, which is output for allocation to the peripheral interface.

In system 500, an updated discrete power level may be allocated to the peripheral interface when processed signal conditioning alters a previously processed power allocation level. System 500 may maintain a power level per peripheral interface until a next sampling update that surpasses or remains at the current level. Further, as noted above, processing of a sample may include rounding the sample up to a nearest discrete power level. Here, a power allocation decision may be a round function of either abrupt spiked peak power or moving averaged power that is determined by comparator 506. The abrupt spike may exceed a unit discrete level compared to a previously processed power level, and system 500 may pick up the round of the sampled abrupt peak.

Figure 6:
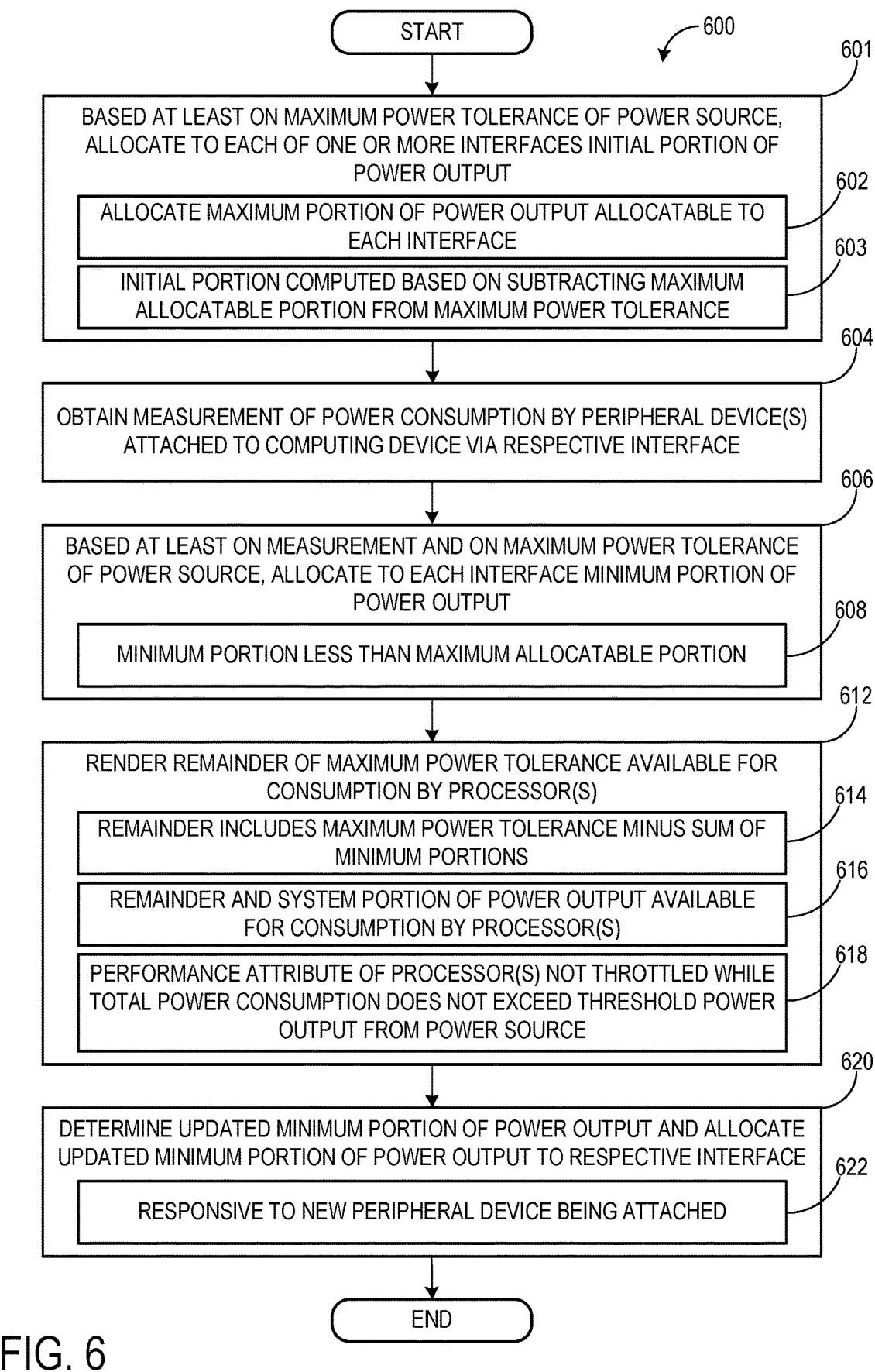
FIG. 6 depicts a flowchart illustrating an example method of allocating portions of power output from a power source of a computing device.

FIG. 6 shows a flowchart illustrating a method 600 of allocating portions of power output from a power source of a computing device. Method 600 may be implemented at computing device 100 (e.g., at processor 105), for example.

At 601, method 600 includes, based at least on a maximum power tolerance of a power source of the computing device, allocating to each of one or more interfaces an initial portion of power output from the power source. Allocating the initial portion to each interface may include allocating 602 to each interface a maximum portion of power output allocatable to the interface. The initial portion may be computed 603 based on subtracting the maximum allocatable portion from the maximum power tolerance. For a USB peripheral that supports USB-PD, a requested or contracted power level may be allocated as the initial portion to the corresponding peripheral interface. Allocating an initial portion of power output to each interface, such as a maximum allocatable portion or contracted power level, may facilitate operation of the interface and an attached peripheral device, including during periods in which the peripheral consumes a maximum consumable power, or during periods in which the power consumption by the peripheral is not measurable with a power meter. Subsequently, lesser portions of power output may be allocated to the interfaces that are less than their initial allocations, where the lesser portions may be selected based on actual peripheral power consumption. As such, the combination of allocating initial portions of power followed by allocating portions of power based on measured power consumption may facilitate peripheral operation while maximizing the efficiency of power allocation to the peripherals.

At 604, method 600 includes obtaining a measurement of power consumption by one or more peripheral devices each attached to the computing device via a respective interface of the one or more interfaces.

At 606, method 600 includes, based at least on the measurement of power consumption and also on the maximum power tolerance of the power source of the computing device, allocating to each of the one or more interfaces a minimum portion of power output from the power source. The minimum portion of power output may be 608 less than the maximum allocatable portion of power output from the power source that is allocatable to each respective interface. For each interface, the minimum portion may be the minimum power sufficient to facilitate operation of an attached peripheral. As such, the allocation of extraneous power may be avoided, leaving a portion of power that is not allocated to the peripherals available for use by non-peripheral components of the computing device.

At 612, method 600 includes rendering a remainder of the maximum power tolerance available for consumption by one or more processors of the computing device. The remainder may include 614 the maximum power tolerance minus a sum of the minimum portions allocated to each respective interface. The remainder and a system portion of power output from the power source may be available 616 for consumption by the one or more processors. A performance attribute of the one or more processors may not be throttled 618 while total power consumption by the computing device does not exceed a threshold power output from the power source. At 620, method 600 includes determining an updated minimum portion of power output for each respective interface, and allocating the updated minimum portion of power output to the respective interfaces. The updated minimum portions for the peripheral interfaces may be determined responsive to detecting the attachment of a new peripheral device 622. For example, a new peripheral device may be attached while an existing peripheral device is already attached, where the attachment of the new peripheral may prompt an updated determination of minimum allocations to both peripheral interfaces to which the peripherals are attached. Alternatively or additionally, in response to detecting a change in power consumption by a peripheral device between adjacent sampling periods greater than or equal to a threshold, an updated minimum portion of power output from the power source to be allocated to respective interface of the peripheral device may be determined. The duration of sampling periods may be selected to provide adaptive power allocations that are responsive to changes in peripheral power consumption, yet are not so granular so as to cause rapidly changing or overly transient allocations.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
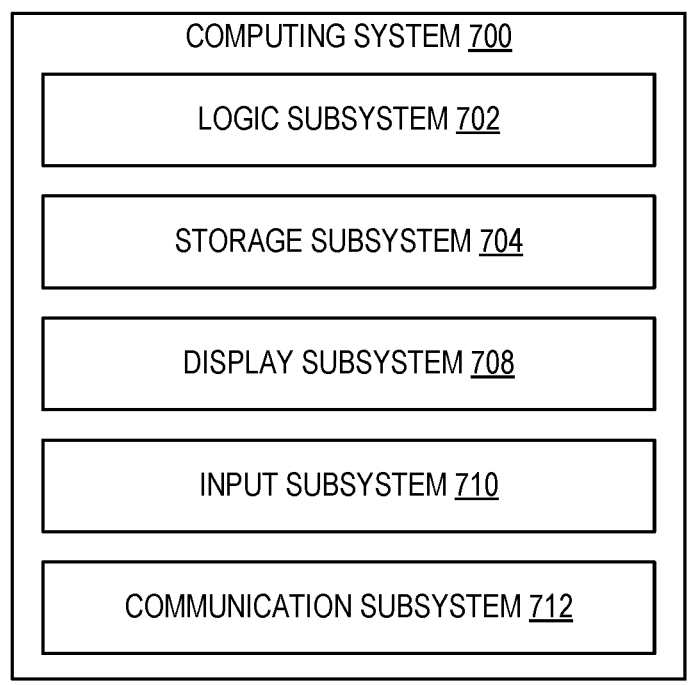
FIG. 7 depicts a block diagram of an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic subsystem 702 and a storage subsystem 704. Computing system 700 may optionally include a display subsystem 708, input subsystem 710, communication subsystem 712, and/or other components not shown in FIG. 7.

Logic subsystem 702 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic machines configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 704 includes one or more physical devices configured to hold instructions executable by the logic subsystem to implement the methods and processes described herein. When such methods and processes are implemented, the state of storage subsystem 704 may be transformed—e.g., to hold different data.

Storage subsystem 704 may include removable and/or built-in devices. Storage subsystem 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 704 may include volatile, nonvolatile, dynamic, static, read/write, read-only, random-access, sequential-access, location-addressable, file-addressable, and/or content-addressable devices.

It will be appreciated that storage subsystem 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 702 and storage subsystem 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic subsystem 702 executing instructions held by storage subsystem 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 708 may be used to present a visual representation of data held by storage subsystem 704. This visual representation may take the form of a graphical user interface (GUI). As the herein described methods and processes change the data held by the storage subsystem, and thus transform the state of the storage subsystem, the state of display subsystem 708 may likewise be transformed to visually represent changes in the underlying data. Display subsystem 708 may include one or more display devices utilizing virtually any type of technology. Such display devices may be combined with logic subsystem 702 and/or storage subsystem 704 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 712 may be configured to communicatively couple computing system 700 with one or more other computing devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides at a computing device, a method, comprising based at least on a maximum power tolerance of a power source of the computing device, allocating to each of one or more interfaces an initial portion of power output from the power source, obtaining a measurement of power consumption by one or more peripheral devices each attached to the computing device via a respective interface of the one or more interfaces, based at least on the measurement of power consumption and also on the maximum power tolerance of the power source, allocating to each of the one or more interfaces a minimum portion of power output from the power source, and rendering a remainder of the maximum power tolerance available for consumption by one or more processors of the computing device, the remainder including the maximum power tolerance minus a sum of the minimum portions allocated to each respective interface, where the remainder and a system portion of power output from the power source are available for consumption by the one or more processors, and where a performance attribute of the one or more processors is not throttled while a total power consumption by the computing device does not exceed a threshold power output from the power source. In some such examples, for each of the one or more interfaces, the minimum portion of power output is less than a maximum allocatable portion of power output from the power source that is allocatable to each interface. In some such examples, the initial portion of power output allocated to each of the one or more interfaces is computed based on subtracting the maximum allocatable portion of power output that is allocatable to the interface from the maximum power tolerance. In some such examples, the initial portion of power output allocated to each of the one or more interfaces alternatively or additionally is the maximum allocatable portion of power output allocatable to the interface. In some such examples, the performance attribute of the one or more processors includes a clock frequency. In some such examples, the power source includes a battery, and the system portion of power output varies with a charge level of the battery. In some such examples, the method alternatively or additionally comprises for each of the one or more peripheral devices, in response to detecting a change in power consumption by the peripheral device between adjacent sampling periods greater than or equal to a threshold, determining an updated minimum portion of power output from the power source to be allocated to the respective interface of the peripheral device, and allocating the updated minimum portion of power output to the respective interface of the peripheral device. In some such examples, the updated minimum portion of power output is rounded up to one of a plurality of discrete power output levels. In some such examples, the method alternatively or additionally comprises for each of the one or more interfaces, in response to detecting an attachment of a new peripheral device to the computing device, determining an updated minimum portion of power output from the power source to be allocated to the interface, and allocating the updated minimum portion of power output to the interface.

Another example provides a computing device, comprising a logic subsystem comprising one or more processors, and a storage subsystem comprising instructions executable by the logic subsystem to based at least on a maximum power tolerance of a power source of the computing device, allocate to each of one or more interfaces an initial portion of power output from the power source, obtain a measurement of power consumption by one or more peripheral devices each attached to the computing device via a respective interface of the one or more interfaces, based at least on the measurement of power consumption and also on the maximum power tolerance of the power source, allocate to each of the one or more interfaces a minimum portion of power output from the power source, and render a remainder of the maximum power tolerance available for consumption by one or more processors of the computing device, the remainder including the maximum power tolerance minus a sum of the minimum portions allocated to each respective interface, where the remainder and a system portion of power output from the power source are available for consumption by the one or more processors, and where a performance attribute of the one or more processors is not throttled while a total power consumption by the computing device does not exceed a threshold power output from the power source. In some such examples, for each of the one or more interfaces, the minimum portion of power output is less than a maximum allocatable portion of power output from the power source that is allocatable to each interface. In some such examples, the initial portion of power output allocated to each of the one or more interfaces is computed based on subtracting the maximum allocatable portion of power output that is allocatable to the interface from the maximum power tolerance. In some such examples, the initial portion of power output allocated to each of the one or more interfaces alternatively or additionally is the maximum allocatable portion of power output allocatable to the interface. In some such examples, the performance attribute of the one or more processors includes a clock frequency. In some such examples, the power source includes a battery, and where the system portion of power output varies with a charge level of the battery. In some such examples, the computing device alternatively or additionally comprises instructions executable to for each of the one or more peripheral devices, in response to detecting a change in power consumption by the peripheral device between adjacent sampling periods greater than or equal to a threshold, determining an updated minimum portion of power output from the power source to be allocated to respective interface of the peripheral device, and allocating the updated minimum portion of power output to the respective interface of the peripheral device. In some such examples, the updated minimum portion of power output is rounded up to one of a plurality of discrete power output levels. In some such examples, the computing device alternatively or additionally comprises instructions executable to for each of the one or more interfaces, in response to detecting an attachment of a new peripheral device to the computing device, determining an updated minimum portion of power output from the power source to be allocated to the interface, and allocating the updated minimum portion of power output to the interface.

Another example provides at a computing device, a method, comprising based at least on a maximum power tolerance of a power source of the computing device, allocating to each of one or more USB interfaces an initial portion of power output from the power source, obtaining a measurement of power consumption by one or more USB peripheral devices each attached to the computing device via a respective USB interface of the one or more USB interfaces, based at least on the measurement of power consumption and also on the maximum power tolerance of the power source, allocating to each of the one or more USB interfaces a minimum portion of power output from the power source, and rendering a remainder of the maximum power tolerance available for consumption by one or more processors of the computing device, the remainder including the maximum power tolerance minus a sum of the minimum portions allocated to each respective USB interface, where the remainder and a system portion of power output from the power source are available for consumption by the one or more processors, and where a performance attribute of the one or more processors is not throttled while a total power consumption by the computing device does not exceed a threshold power output from the power source. In some such examples, for each of the one or more USB interfaces, the minimum portion of power output is less than a maximum allocatable portion of power output from the power source that is allocatable to each USB interface.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a computing device, a method, comprising:
based at least on a maximum power tolerance of a power source of the computing device, allocating to each of one or more interfaces an initial portion of power output from the power source, where the maximum power tolerance is a predetermined amount of power set aside for prioritized on-demand use by one or more peripheral devices each attached to the computing device via a respective interface of the one or more interfaces, such prioritized on-demand use precluding any other use of the maximum power tolerance when the maximum power tolerance is exhausted by usage demands of the one or more peripheral devices;
obtaining a measurement of power consumption by the one or more peripheral devices;
based at least on the measurement of power consumption and also on the maximum power tolerance of the power source, allocating to each of the one or more interfaces a minimum portion of power output from the power source; and
rendering, if not exhausted by usage demands of the one or more peripheral devices, a remainder of the maximum power tolerance available for consumption by one or more processors of the computing device, the remainder including the maximum power tolerance minus a sum of the minimum portions allocated to each respective interface, where the remainder and a system portion of power output from the power source are available for consumption by the one or more processors, and where a performance attribute of the one or more processors is not throttled while a total power consumption by the computing device does not exceed a threshold power output from the power source.

2. The method of claim 1, where, for each of the one or more interfaces, the minimum portion of power output is less than a maximum allocatable portion of power output from the power source that is allocatable to each interface.

3. The method of claim 2, where the initial portion of power output allocated to each of the one or more interfaces is computed based on subtracting the maximum allocatable portion of power output that is allocatable to the interface from the maximum power tolerance.

4. The method of claim 2, where the initial portion of power output allocated to each of the one or more interfaces is the maximum allocatable portion of power output allocatable to the interface.

5. The method of claim 1, where the performance attribute of the one or more processors includes a clock frequency.

6. The method of claim 1, where the power source includes a battery, and where the system portion of power output varies with a charge level of the battery.

7. The method of claim 1, further comprising:
for each of the one or more peripheral devices, in response to detecting a change in power consumption by the peripheral device between adjacent sampling periods greater than or equal to a threshold, determining an updated minimum portion of power output from the power source to be allocated to the respective interface of the peripheral device, and allocating the updated minimum portion of power output to the respective interface of the peripheral device.

8. The method of claim 7, where the updated minimum portion of power output is rounded up to one of a plurality of discrete power output levels.

9. The method of claim 1, further comprising:
for each of the one or more interfaces, in response to detecting an attachment of a new peripheral device to the computing device, determining an updated minimum portion of power output from the power source to be allocated to the interface, and allocating the updated minimum portion of power output to the interface.

10. A computing device, comprising:
a logic subsystem comprising one or more processors; and
a storage subsystem comprising instructions executable by the logic subsystem to:
based at least on a maximum power tolerance of a power source of the computing device, allocate to each of one or more interfaces an initial portion of power output from the power source, where the maximum power tolerance is a predetermined amount of power set aside for prioritized on-demand use by one or more peripheral devices each attached to the computing device via a respective interface of the one or more interfaces, such prioritized on-demand use precluding any other use of the maximum power tolerance when the maximum power tolerance is exhausted by usage demands of the one or more peripheral devices;
obtain a measurement of power consumption by the one or more peripheral devices;
based at least on the measurement of power consumption and also on the maximum power tolerance of the power source, allocate to each of the one or more interfaces a minimum portion of power output from the power source; and
render, if not exhausted by usage demands of the one or more peripheral devices, a remainder of the maximum power tolerance available for consumption by one or more processors of the computing device, the remainder including the maximum power tolerance minus a sum of the minimum portions allocated to each respective interface, where the remainder and a system portion of power output from the power source are available for consumption by the one or more processors, and where a performance attribute of the one or more processors is not throttled while a total power consumption by the computing device does not exceed a threshold power output from the power source.

11. The computing device of claim 10, where, for each of the one or more interfaces, the minimum portion of power output is less than a maximum allocatable portion of power output from the power source that is allocatable to each interface.

12. The computing device of claim 11, where the initial portion of power output allocated to each of the one or more interfaces is computed based on subtracting the maximum allocatable portion of power output that is allocatable to the interface from the maximum power tolerance.

13. The computing device of claim 11, where the initial portion of power output allocated to each of the one or more interfaces is the maximum allocatable portion of power output allocatable to the interface.

14. The computing device of claim 10, where the performance attribute of the one or more processors includes a clock frequency.

15. The computing device of claim 10, where the power source includes a battery, and where the system portion of power output varies with a charge level of the battery.

16. The computing device of claim 10, further comprising instructions executable to:
for each of the one or more peripheral devices, in response to detecting a change in power consumption by the peripheral device between adjacent sampling periods greater than or equal to a threshold, determining an updated minimum portion of power output from the power source to be allocated to respective interface of the peripheral device, and allocating the updated minimum portion of power output to the respective interface of the peripheral device.

17. The computing device of claim 16, where the updated minimum portion of power output is rounded up to one of a plurality of discrete power output levels.

18. The computing device of claim 10, further comprising instructions executable to:
for each of the one or more interfaces, in response to detecting an attachment of a new peripheral device to the computing device, determining an updated minimum portion of power output from the power source to be allocated to the interface, and allocating the updated minimum portion of power output to the interface.

19. At a computing device, a method, comprising:
based at least on a maximum power tolerance of a power source of the computing device, allocating to each of one or more USB interfaces an initial portion of power output from the power source, where the maximum power tolerance is a predetermined amount of power set aside for prioritized on-demand use by one or more USB peripheral devices each attached to the computing device via a respective USB interface of the one or more USB interfaces, such prioritized on-demand use precluding any other use of the maximum power tolerance when the maximum power tolerance is exhausted by usage demands of the one or more USB peripheral devices;
obtaining a measurement of power consumption by the one or more USB peripheral devices;
based at least on the measurement of power consumption and also on the maximum power tolerance of the power source, allocating to each of the one or more USB interfaces a minimum portion of power output from the power source; and
rendering, if not exhausted by usage demands of the one or more USB peripheral devices, a remainder of the maximum power tolerance available for consumption by one or more processors of the computing device, the remainder including the maximum power tolerance minus a sum of the minimum portions allocated to each respective USB interface, where the remainder and a system portion of power output from the power source are available for consumption by the one or more processors, and where a performance attribute of the one or more processors is not throttled while a total power consumption by the computing device does not exceed a threshold power output from the power source.

20. The method of claim 19, where, for each of the one or more USB interfaces, the minimum portion of power output is less than a maximum allocatable portion of power output from the power source that is allocatable to each USB interface.

* * * * *